United States Patent
Niewiadomski et al.

(10) Patent No.: US 11,279,187 B2
(45) Date of Patent: Mar. 22, 2022

(54) AUTOMATIC ALIGNMENT REATTEMPT IN AUTOMATIC HITCH OPERATION

(71) Applicant: Ford Global Technologies, LLC, Dearborn, MI (US)

(72) Inventors: Luke Niewiadomski, Dearborn, MI (US); Roger Arnold Trombley, Ann Arbor, MI (US); Kyle Simmons, New Boston, MI (US); Shannon Brooks-Lehnert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 16/810,030

(22) Filed: Mar. 5, 2020

(65) Prior Publication Data
US 2021/0276378 A1    Sep. 9, 2021

(51) Int. Cl.
| *B60D 1/26* | (2006.01) |
| *B60D 1/36* | (2006.01) |
| *B60D 1/06* | (2006.01) |
| *G06K 9/00* | (2006.01) |
| *B60D 1/62* | (2006.01) |
| *B62D 15/02* | (2006.01) |

(52) U.S. Cl.
CPC ............... *B60D 1/26* (2013.01); *B60D 1/06* (2013.01); *B60D 1/36* (2013.01); *B60D 1/363* (2013.01); *B60D 1/62* (2013.01); *B62D 15/025* (2013.01); *G06K 9/00791* (2013.01)

(58) Field of Classification Search
CPC ..................................... B60D 1/26; B60D 1/36
USPC ......................................................... 280/477
See application file for complete search history.

(56) References Cited

U.S. PATENT DOCUMENTS

| 7,777,615 | B2 * | 8/2010 | Okuda | ..................... B60D 1/36 340/431 |
| 10,414,437 | B2 | 9/2019 | Pilutti et al. | |
| 2019/0339704 | A1 * | 11/2019 | Yu | ........................... G06T 7/246 |

* cited by examiner

*Primary Examiner* — Kevin Hurley
*Assistant Examiner* — Hosam Shabara
(74) *Attorney, Agent, or Firm* — Raymond Coppiellie; Price Heneveld LLP

(57) ABSTRACT

A hitch assist system for a vehicle is provided herein. The hitch assist system includes a sensing system configured to detect a hitch assembly and a coupler. A controller is configured to determine an offset between the hitch assembly and the coupler. The controller is further configured to generate a command for maneuvering the vehicle forward based on the offset exceeding an offset threshold. The controller is further configured to generate a command for subsequently maneuvering the vehicle rearward along an alignment path. The controller is configured to prompt termination of the forward maneuver of the vehicle based on a determination that alignment of the hitch assembly with the coupler is feasible via execution of the alignment path.

20 Claims, 12 Drawing Sheets

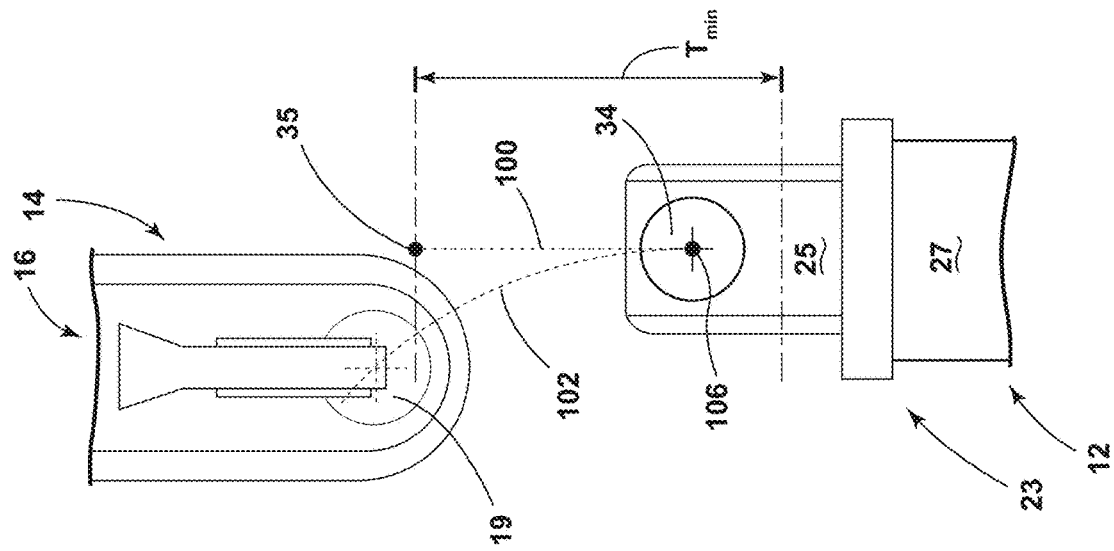
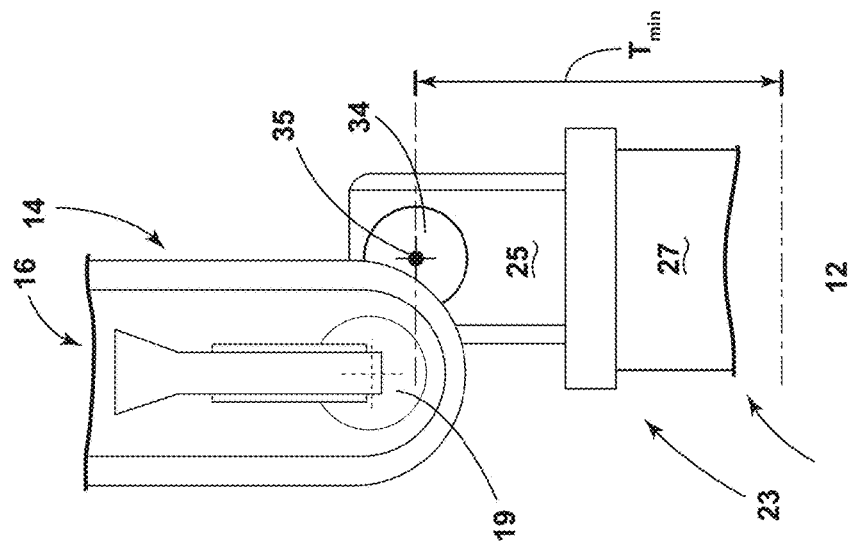
FIG. 9B
FIG. 9A

AUTOMATIC ALIGNMENT REATTEMPT IN AUTOMATIC HITCH OPERATION

FIELD OF THE INVENTION

The present invention generally relates to a vehicle hitch assistance system. In particular, the invention relates to a vehicle hitch assistance system configured for automatic alignment reattempts by a vehicle relative to a trailer.

BACKGROUND OF THE INVENTION

The process of hitching a vehicle to a trailer can be difficult, especially to those lacking experience. Accordingly, there is a need for a system that simplifies the process for a user.

SUMMARY OF THE INVENTION

According to one aspect of the present disclosure, a system for assisting a vehicle in hitching with a trailer includes a sensing system that is configured to separately detect a vehicle hitch assembly and a trailer coupler. A controller is configured to designate an initial position of a portion of the hitch assembly relative to the coupler as an attempted alignment position. The controller is configured to determine an offset between the hitch assembly and the coupler at the attempted alignment position. The controller is configured to generate a command for maneuvering the vehicle forward based on the offset exceeding an offset threshold. The controller is configured to generate a rearward alignment path. The controller is further configured to prompt termination of the forward maneuver of the vehicle based on a determination that alignment of the hitch assembly with the coupler is feasible via execution of the alignment path.

Embodiments of the first aspect of the present disclosure may include any one or a combination of the following features:
- the offset between the hitch assembly and the coupler is determined while the vehicle is stopped;
- the sensing system includes one or more cameras;
- at least one of the one or more cameras is located on a rear of the vehicle and is disposed to capture one or more images of a rear-vehicle scene;
- the controller is further configured to maintain a steering angle of a pair of steered wheels of the vehicle at a fixed angle during the forward maneuver of the vehicle;
- the hitch assembly comprises a hitch ball and the coupler comprises a coupler ball socket and the offset is determined between the hitch ball and the coupled ball socket;
- the offset threshold is about one half of a diameter of the hitch ball; and
- the controller only terminates the forward maneuver of the vehicle based on the determination that alignment of the hitch assembly with the coupler is feasible via execution of the alignment path after a minimum forward travel distance threshold has been exceeded by the vehicle.

According to another aspect of the present disclosure, a method of correcting misalignment between a vehicle hitch assembly and a trailer coupler. The method includes the step of determining an offset of a hitch ball of the hitch assembly relative to the coupler. The method further includes the step of maneuvering the vehicle forward based on the offset exceeding an offset threshold. The method further includes the step of calculating an alignment path to align the hitch ball with the coupler. The method further includes the step of stopping the forward maneuver of the vehicle based on at least one of a determination that alignment of the hitch ball with the coupler is feasible via execution of the alignment path and a maximum forward travel distance threshold being met by the forward maneuver of the vehicle. The method further includes the step of maneuvering the vehicle rearward along the alignment path. The method further includes the step of stopping the rearward maneuver of the vehicle at an end of the alignment path. The method further includes the step of recalculating the offset of the hitch ball relative to the coupler.

Embodiments of the present aspect of the present disclosure may include any one or a combination of the following steps and features:
- when in the step of a stopping the forward maneuver of the vehicle, the forward maneuver of the vehicle is stopped based on the determination that alignment of the hitch ball with the coupler is feasible via execution of the alignment path, the forward maneuver of the vehicle is stopped only after a minimum forward travel distance threshold has been exceeded by the vehicle during the forward maneuver;
- when, in the step of stopping the forward maneuver of the vehicle, the forward maneuver of the vehicle is stopped based on the maximum forward travel distance threshold being met, the recalculated offset exceeds the offset threshold and the vehicle is subsequently maneuvered forward based on the recalculated offset exceeding the offset threshold;
- when the forward maneuver of the vehicle is stopped based on the determination that alignment of the hitch ball with the coupler is feasible via execution of the alignment path, the distance traveled in the forward maneuver of the vehicle is less than the maximum forward travel distance threshold;
- maintaining a substantially constant steering angle of the steered wheels of the vehicle while maneuvering the vehicle forward;
- the substantially constant steering angle is about 0°; and
- a maximum steering angle of the vehicle is maintained while maneuvering the vehicle rearward along the alignment path when the forward maneuver of the vehicle is stopped based on the maximum forward travel distance threshold being met by the forward maneuver of the vehicle.

According to another aspect of the present disclosure, a system for assisting in aligning a vehicle with a trailer is provided. The hitch assist system includes a sensing system configured to separately detect a hitch assembly of the vehicle and a coupler of the trailer. A controller is configured to generate a command for maneuvering the vehicle along a positioning path to an endpoint to position the hitch assembly in an initial position adjacent to the coupler. The controller is further configured to generate a command for maneuvering the vehicle forward from the endpoint. The controller is configured to generate a command to terminate the forward maneuver of the vehicle based on a determination that alignment of the hitch assembly with the coupler is feasible via a rearward movement of the vehicle at a designated maximum steering angle. The controller is further configured to generate a command for subsequently maneuvering the vehicle rearward along an alignment path such that the hitch assembly is aligned with the coupler upon completion of the alignment path.

Embodiments of the present aspect of the present disclosure may include any one or a combination of the following features:

an offset between the hitch assembly and the coupler is determined while the vehicle is stopped at the endpoint;

the controller is configured to generate the command for maneuvering the vehicle forward from the endpoint based on a determination that the offset between the hitch assembly and the coupler exceeds an offset threshold;

the controller determines the positioning path of the vehicle via execution of a path derivation routine and determines the alignment path of the vehicle via a subsequent execution of the path derivation routine; and the controller is further configured to generate a command to maintain a pair of steered wheels of the vehicle at a fixed angle during the forward maneuver of the vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9A is an overhead schematic view of the hitch assembly of the vehicle and the coupler of the trailer showing the hitch assembly in the misaligned position relative to the coupler;

FIG. 9B is an overhead schematic view of the hitch assembly of the vehicle and the coupler of the trailer showing the hitch assembly in a position forward of the misaligned position;

DETAILED DESCRIPTION OF THE PREFERRED EMBODIMENTS

Figure 1:
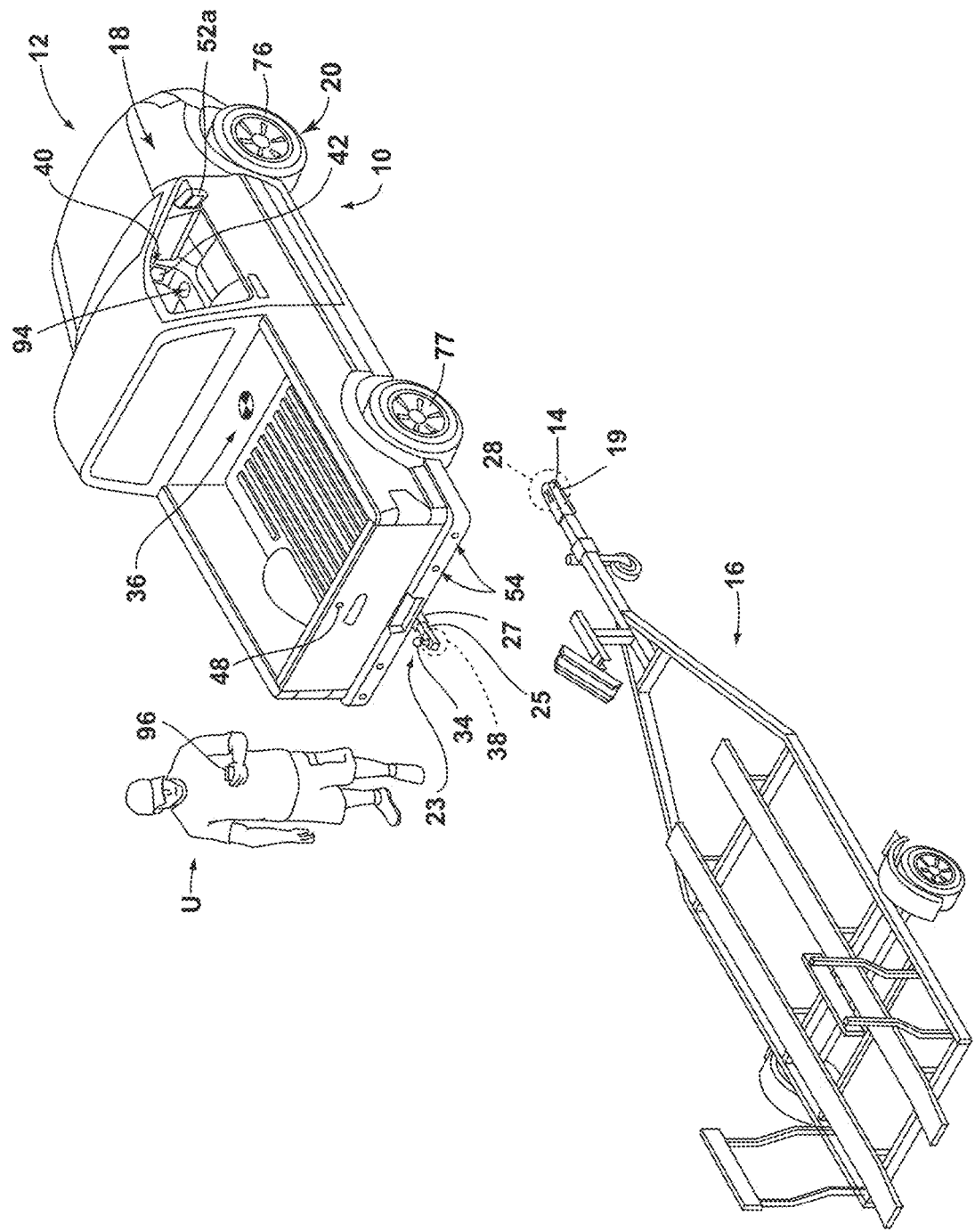
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes a controller 26 acquiring position data of a coupler 14 of a trailer 16 and deriving a vehicle positioning path 32 (FIG. 3) to align a hitch assembly 23 of the vehicle 12 with the coupler 14. In some examples, the hitch assembly 23 may include a ball mount 25 supporting a hitch ball 34. The hitch ball 34 may be fixed on the ball mount 25 that extends from the vehicle 12 and/or the hitch ball 34 may be fixed to a portion of the vehicle 12, such as a bumper of the vehicle 12. The ball mount 25 may couple with a receiver 27 that is fixed to the vehicle 12.

Figure 2:
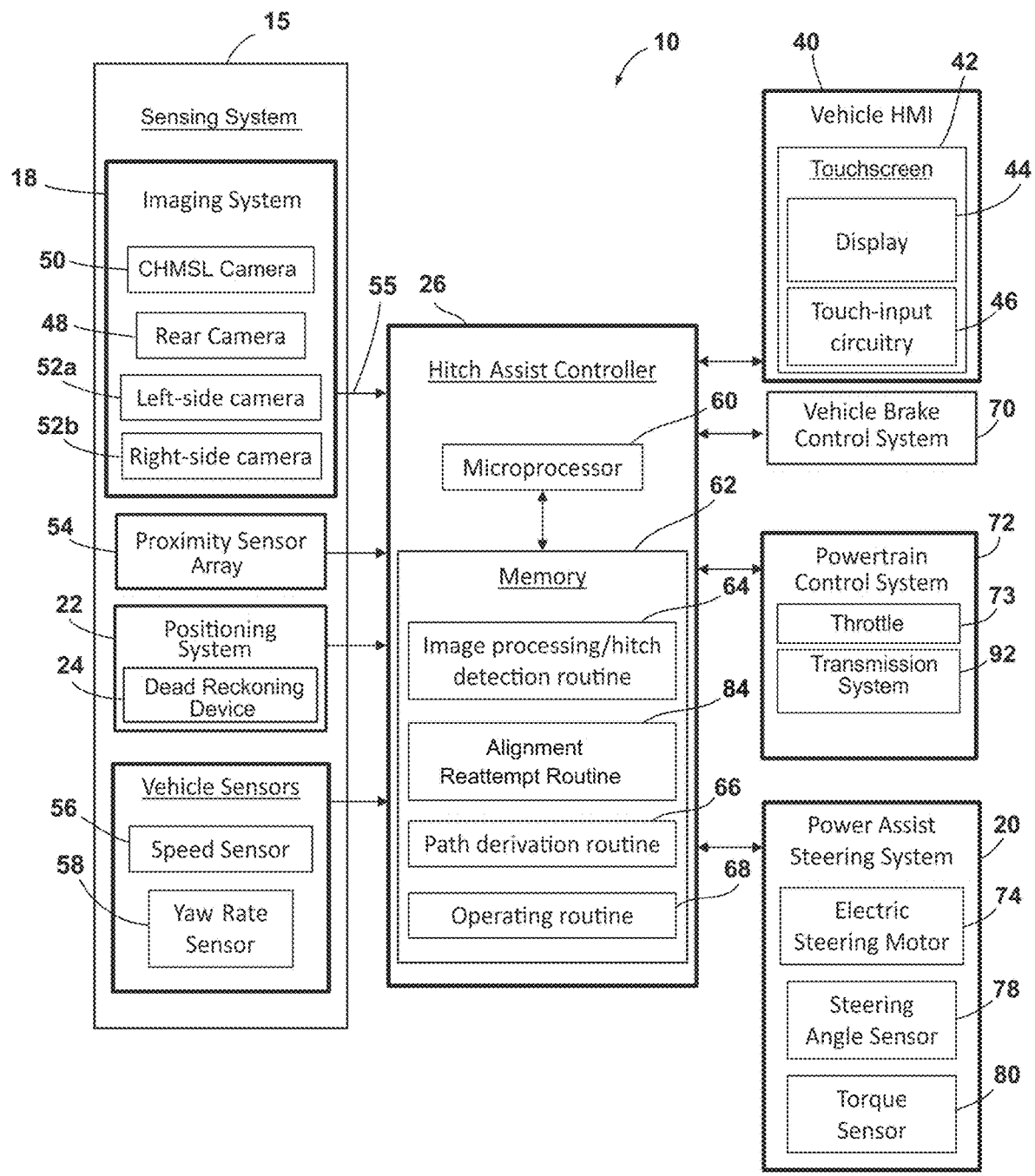
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes a sensing system 15 that includes various sensors and devices that obtain or otherwise provide vehicle status-related information (e.g., imaging system 18, proximity sensor array 54, positioning system 22, vehicle sensors, etc.). For example, in some instances, the sensing system 15 may include a positioning system 22 for providing positional information, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
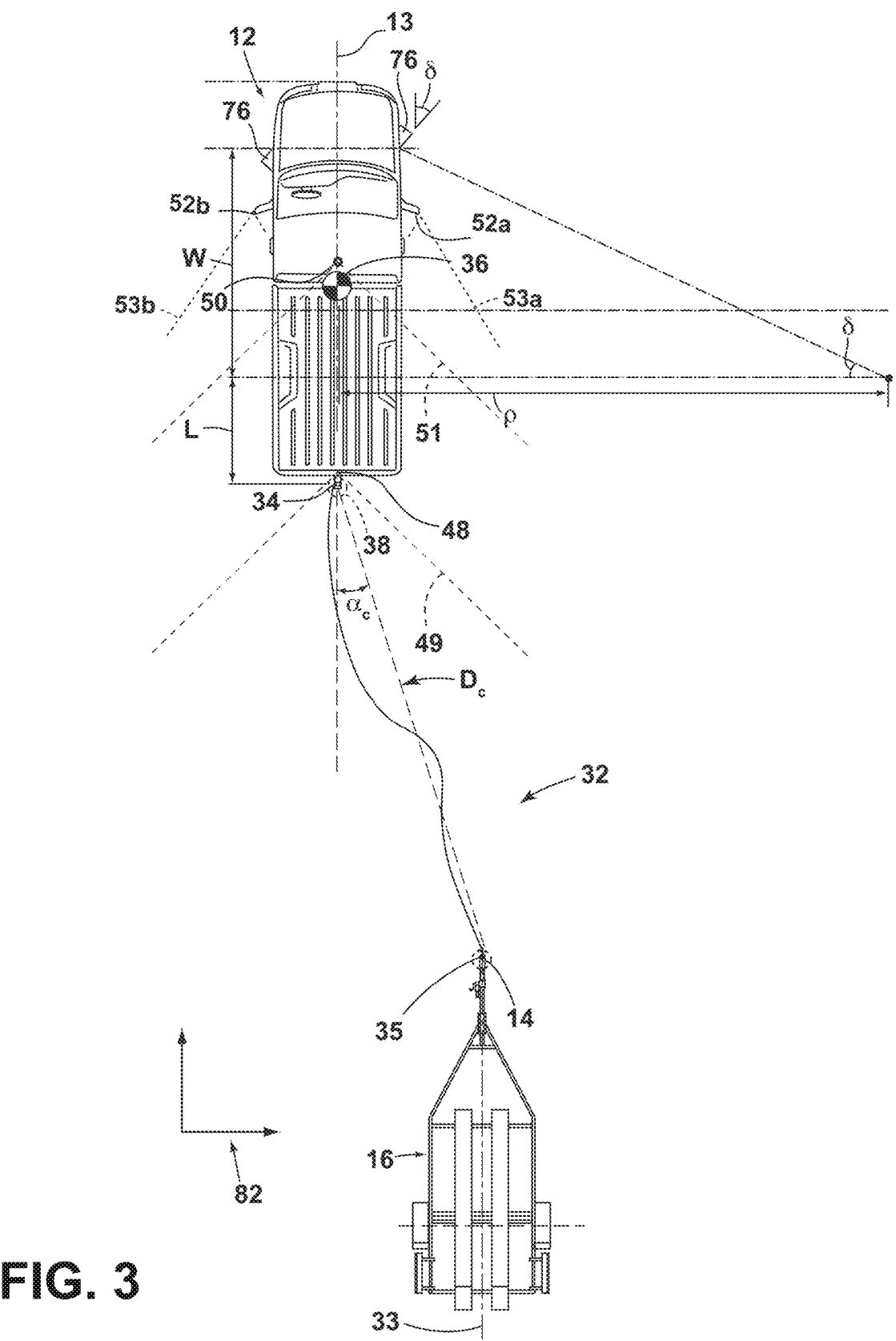
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle S. The controller 26 in the illustrated embodiment processes the current steering angle, in addition to other vehicle 12 conditions to guide the vehicle 12 along the desired positioning path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate A, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of positioning path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touch-input circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the sensing system 15, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded positioning path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, alignment reattempt routine 84 and an operating routine 68. It should be appreciated that the controller 26 may be a stand-alone dedicated controller or may be a shared controller integrated with other control functions, such as integrated with the vehicle sensing system 15, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52*a* and 52*b*, although other arrangements including additional or alternative cameras are possible. In one example, imaging system 18 can include rear camera 48 alone or can be configured such that system 10 utilizes only rear camera 48 in a vehicle with multiple exterior cameras. The rear camera 48 may be located on a rear of the vehicle 12 and may be disposed to capture one or more images of a rear-vehicle scene. In another example, the various cameras 48, 50, 52*a*, 52*b* included in imaging system 18 can be positioned to generally overlap in their respective fields of view, which may correspond with rear camera 48, center high-mount stop light (CHMSL) camera 50, and side-view cameras 52*a* and 52*b*, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53*a*, 53*b*, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52*a*, and 52*b* within imaging system 18. In either example, the image processing routine 64 can include information related to the positioning of any cameras 48, 50, 52*a*, and 52*b* present on vehicle 12 or utilized by system 10, including relative to the center 36 (FIG. 1) of vehicle 12, for example such that the positions of cameras 48, 50, 52*a*, and 52*b* relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including sensing system 15, imaging system 18, positioning system 22, brake control system 70, powertrain control system 72, power assist steering system 20, proximity sensor array 54, positioning system 22, and the vehicle sensors discussed herein generally may be used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of any number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the positioning path 32 being derived to move the hitch ball 34 toward a centrally-aligned position with respect to trailer 16 with the positioning path 32 being refined once the coupler 14 is identified. Such an operational scheme can be implemented when it is determined that trailer 16 is at a far enough distance from vehicle 12 to begin backing without knowing the precise endpoint 35 of positioning path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the positioning path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the positioning path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle positioning path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \quad (2)$$

Path derivation routine 66 can be programmed to derive vehicle positioning path 32 to align a known location of the vehicle hitch ball 34 with the estimated position 28 of coupler 14 that takes into account the determined minimum turning radius $\rho_{min}$ to allow positioning path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a positioning path 32 that achieves the needed lateral and forward-backward movement of vehicle 12 within the limitations of steering system 20. The derivation of positioning path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement of coupler 14 in a driving direction by determining the movement of coupler 14 in the vertical direction that will be needed to receive hitch ball 34 within coupler 14. Such functionality is discussed further in co-pending, commonly-assigned U.S. Pat. No. 9,821,845 and U.S. Pat. App. Pub. No. 2020/0023695, the entire disclosures of which are hereby incorporated by reference herein.

As discussed above, once the desired positioning path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along positioning path 32. In particular, the positioning path 32, having been determined based on the vehicle 12 and the geometry of steering system 20, can adjust the steering angle $\delta$, as dictated by positioning path 32, depending on the position of vehicle 12 therealong. It is additionally noted that in an embodiment, the positioning path 32 may comprise a progression of steering angle $\delta$ adjustment that is dependent on the tracked vehicle position.

As illustrated in FIG. 3, vehicle positioning path 32 can be determined to achieve the needed lateral and rearward movement within the smallest area possible and/or with the lowest number of maneuvers. In the illustrated example of FIG. 3, positioning path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted positioning path 32 may be used. It is further noted that the estimates for the positioning $D_c$, $\alpha_c$ of coupler 14 may become more accurate as vehicle 12 traverses positioning path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for positioning path 32, as discussed above. In a similar manner, the positioning path 32, as derived using the position and orientation data acquired from a portable device 96, such a smartphone, can be fine-tuned once the image processing routine 64 can identify coupler 14 in the image data 55, with continued updates for positioning path 32 being similarly derived as the image data 55 becomes increasingly clear during the approach toward trailer 16. It is further noted that, until such a determination can be made, the dead reckoning device 24 can be used to track the location of vehicle 12 in its movement along positioning path 32 toward the initially-derived endpoint 35.

Figure 4:
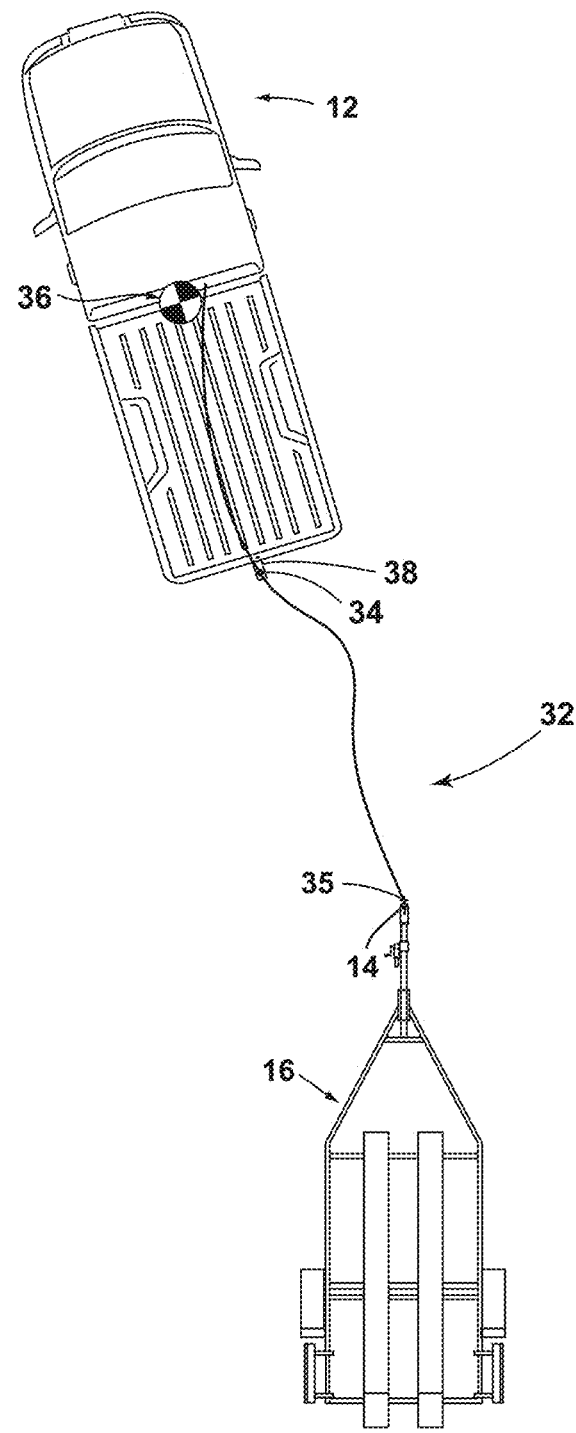
FIG. 4 is an overhead schematic view of the vehicle during a subsequent step of the alignment sequence with the trailer.
Figure 5:
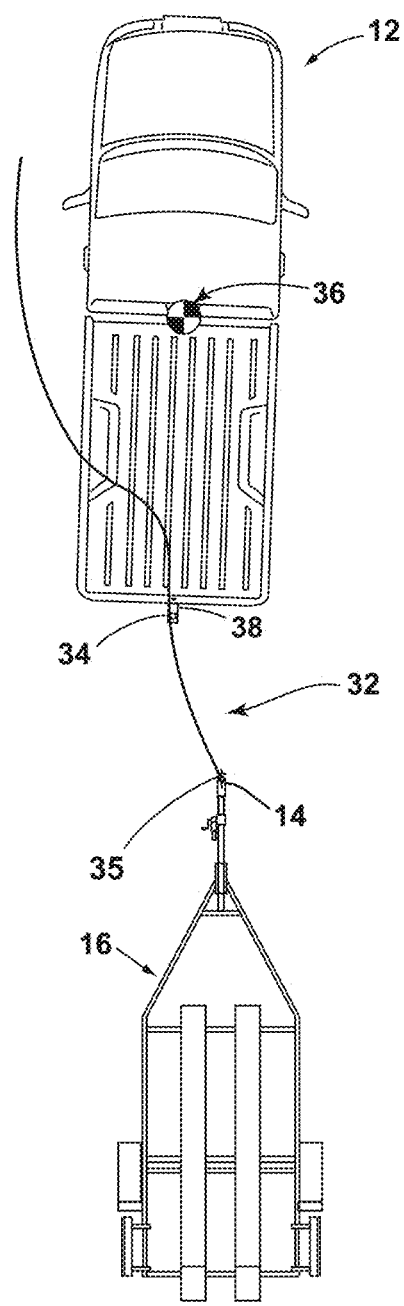
FIG. 5 is an overhead schematic view of the vehicle during a subsequent step of the alignment sequence with the trailer.
Figure 6:
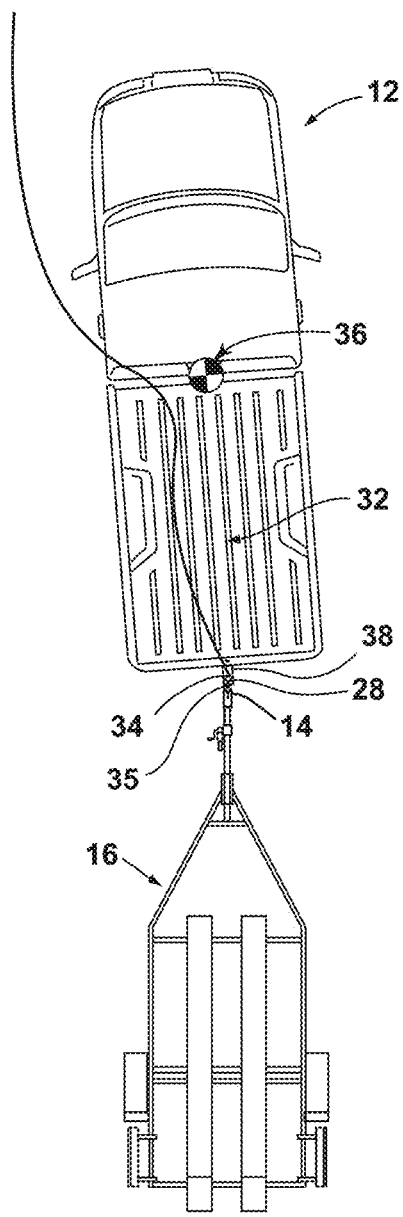
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the positioning path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, with continued movement of vehicle 12 along positioning path 32. As discussed above, the position of vehicle 12 can also be monitored by dead reckoning device 24 with the position 28 of coupler 14 being continuously updated and fed into path derivation routine 66 in case positioning path 32 and or endpoint 35 can be refined or should be updated (due to, for example, improved distance $D_c$ or offset angle $\alpha_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38 thereof relative to the tracked position 28 of coupler 14, as discussed above and shown in FIG. 6.

Figure 7:
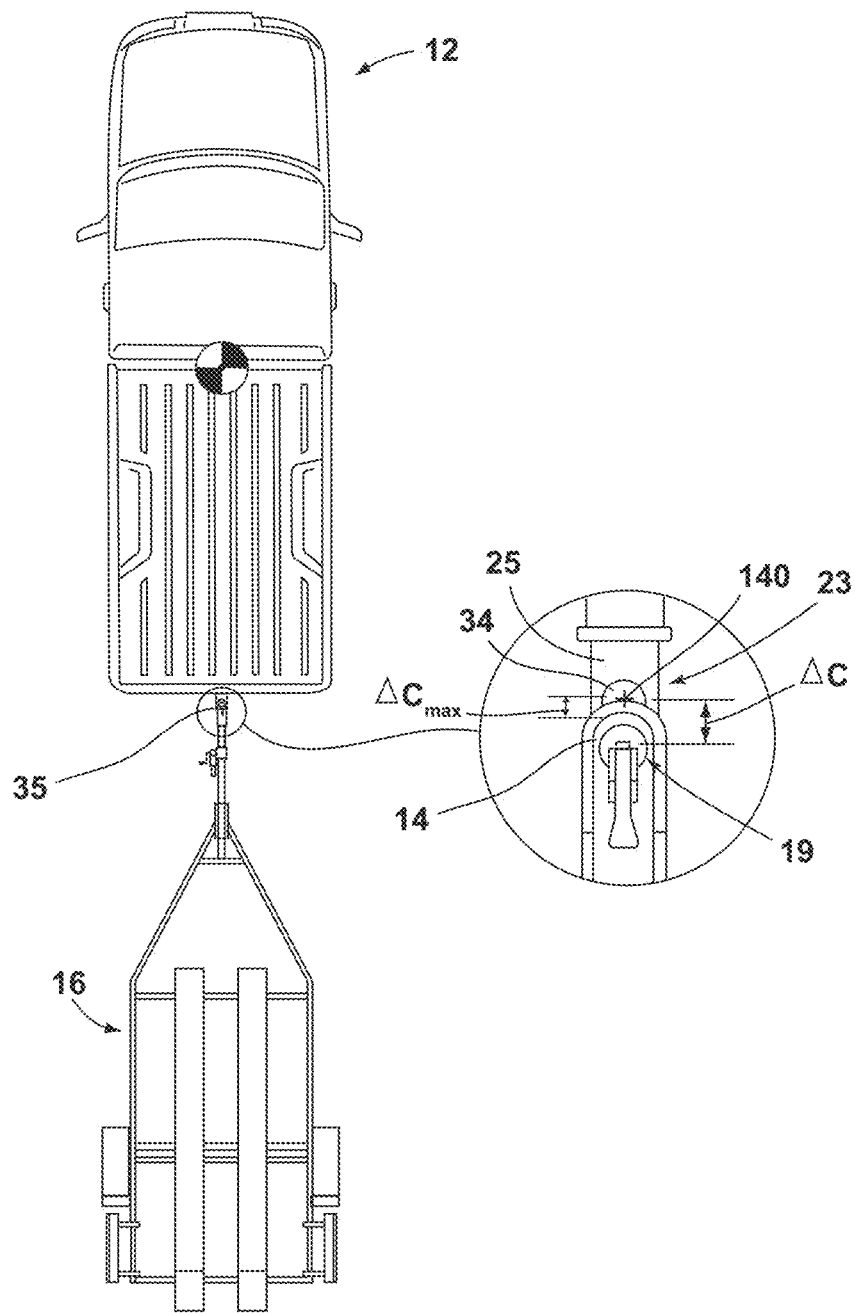
FIG. 7 is an overhead schematic view of the vehicle showing the hitch ball of the vehicle offset from a coupler of the trailer a distance greater than an offset threshold.

Referring now to FIG. 7, in various embodiments, the intended result of maneuvering the vehicle 12 along the positioning path 32 to the endpoint 35 is alignment of the hitch assembly 23 with the coupler 14 of the trailer 16, as discussed above. However, as discussed further below, the position of the hitch assembly 23 relative to the coupler 14 when the vehicle 12 has reached the endpoint 35 may vary under different circumstances due to a variety of factors. As such, the controller 26 may be configured to determine whether acceptable alignment has indeed occurred between the hitch assembly 23 or a portion thereof (e.g., the hitch ball 34), and the coupler 14 upon completion of movement along the positioning path 32 by the vehicle 12. In various embodiments, this may be accomplished by determining the position of the hitch assembly 23 relative to the position of the coupler 14. In some examples, an offset $\Delta c$ between the hitch assembly and the coupler 14 may be calculated and compared with an offset threshold $\Delta c_{max}$.

Alignment of the hitch assembly 23 with the coupler 14 of the trailer 16 may occur when there is little or no detectable offset $\Delta c$ between the hitch assembly 23 and the coupler 14 of the trailer 16, such that the hitch assembly 23 and the coupler 14 may be aligned without additional movement of the vehicle 12. In some embodiments, alignment of the hitch assembly 23 with the coupler 14 of the trailer 16 may occur when there is offset $\Delta c$ between the hitch assembly 23 and the coupler 14, but the offset $\Delta c$ does not exceed the offset threshold $\Delta c_{max}$.

The offset threshold $\Delta c_{max}$ distance may be set based on the ability of a user to attach the hitch assembly 23 with the coupler 14 by lowering the coupler 14 of the trailer 16 and/or raising the hitch assembly 23 of the vehicle 12 without additional forward and/or rearward adjustment of the vehicle 12 and/or the trailer (i.e. attachment may occur without additional rotation of the wheels 76 or 77 of the vehicle 12 and/or trailer 16). For example, in some embodiments, in which the hitch assembly 23 includes the hitch ball 34 and the coupler 14 includes a corresponding coupler ball socket 19, the hitch ball 34 of the vehicle 12 may be aligned with the coupler ball socket 19 when the offset $\Delta c$ between the hitch ball 34 and coupler ball socket 19 does not prevent the hitch ball 34 from being seated within the coupler ball socket 19 via vertical movement of the hitch ball 34 and/or the coupler 14—without the need for further rotation of the wheels of the trailer 16 and/or the vehicle 12. In such examples, the offset threshold $\Delta c_{max}$ may be about one half the diameter of the hitch ball 34. As such, the hitch ball 34 may determined to be aligned with the ball socket 19 of coupler 14 when a center point 140 of hitch ball 34 is offset from the center point of the coupler ball socket 19 by not more than one-half of the diameter of the hitch ball 34. The embodiment illustrated in FIG. 7, for example, depicts an offset $\Delta c$ between the hitch ball 34 and the coupler ball socket 19 that is greater than the offset threshold $\Delta c_{max}$. Accordingly, acceptable alignment between the hitch assembly 23 and the coupler 14 has not occurred. It is contemplated that, in various embodiments, the offset threshold $\Delta c_{max}$ may be one or more of a variety of distances and may be set within controller logic and/or memory 62 based on one or more of a variety of factors (e.g., hitch assembly 23 and/or coupler 14 size, type, relative position, etc.).

Referring now to FIGS. 7-10B, as mentioned above, misalignment between the coupler 14 and the hitch assembly 23 (e.g., the hitch assembly 23 being offset from the coupler 14 a distance exceeding the offset threshold $\Delta c_{max}$) may exist when vehicle 12 is at the endpoint 35 of path 32 due to error from a wide range of variables or other factors. For example, various conditions of the brake system, various types of road surfaces, variances in vehicle weight, various tire designs, a level of wear of the tires, a gradient of the terrain, software latency, network interference, etc. may affect the level of precision the vehicle 12 can achieve during alignment of the hitch assembly 23 and the coupler 14.

In various embodiments, the hitch assist system 10 may be configured to execute an alignment reattempt routine 84 that may attempt to remedy the initial misalignment discussed above. Execution of the alignment reattempt routine 84 may prompt the vehicle 12 to make a variety of maneuvers. In some examples, the controller 26, upon determining that misalignment exists between the hitch assembly 23 and the coupler 14, may execute the routine by generating a command for maneuvering the vehicle 12 forward from the endpoint 35 and generating a command for subsequently maneuvering the vehicle 12 rearward along an alignment path 98. As described further herein, in some embodiments, the controller 26 may prompt a plurality of forward and rearward maneuvers of the vehicle 12 in the course of executing the alignment reattempt routine 84.

Referring now to FIGS. 8A-10B, the distance of the forward maneuver of the vehicle 12 during execution of the alignment reattempt routine 84 may be determined based on one or more of a variety of factors. In some embodiments, the distance of the forward maneuver may be based on the feasibility of achieving alignment between the hitch assembly 23 and the coupler 14 via a subsequent rearward maneuver of the vehicle 12 from the forwardly-maneuvered position of vehicle 12. In other words, the distance the vehicle 12 travels before termination of the forward maneuver may be based on the distance the vehicle 12 must be from the trailer 16 in order for the hitch assembly 23 of the vehicle 12 to successfully be aligned with coupler 14 of the trailer 16 via a subsequent rearward maneuver of the vehicle 12.

Figure 8C:
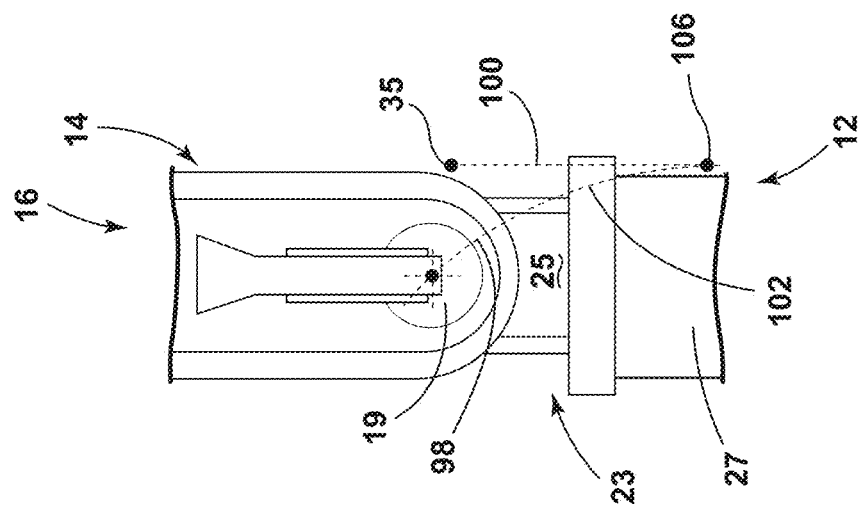
FIG. 8C is an overhead schematic view of the hitch assembly of the vehicle and the coupler of the trailer showing the hitch assembly in the aligned position relative to the coupler.
Figure 8B:
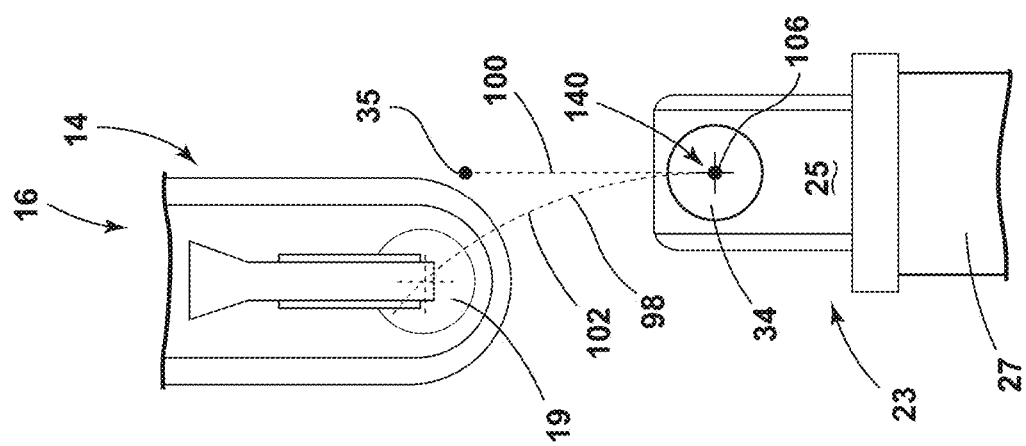
FIG. 8B is an overhead schematic view of the hitch assembly of the vehicle and the coupler of the trailer showing the hitch assembly maneuvered forward from the misaligned position.
Figure 8A:
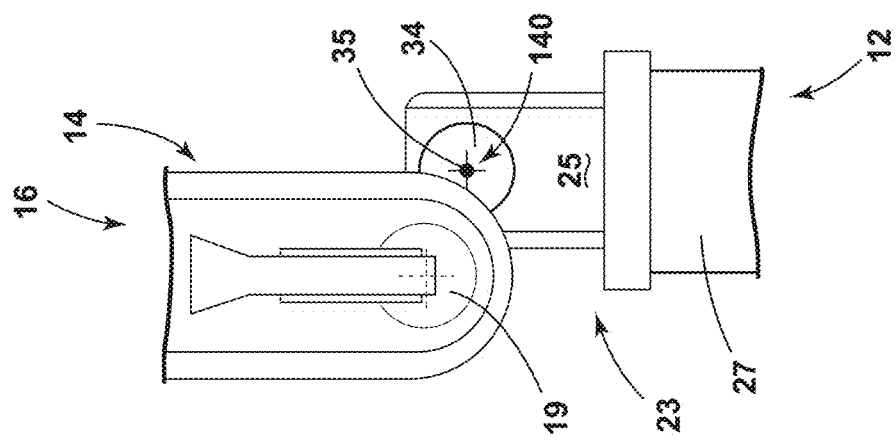
FIG. 8A is an overhead schematic view of a hitch assembly of the vehicle and the coupler of the trailer showing the hitch assembly in a misaligned position relative to the coupler.

Referring now to FIGS. 8A and 8B, in various embodiments, the controller 26 in conjunction with various other vehicle components and/or systems (e.g., the sensing system 15) may determine the feasibility of aligning the hitch assembly 23 with the coupler 14 when the vehicle 12 is at a given position. In some embodiments, the controller 26 may make a determination as to the feasibility of alignment based on whether the hitch assembly 23 would intersect the coupler 14 if the vehicle 12 were reversed at a maximum steering angle $\delta_{max}$. In other words, whether alignment between the hitch assembly 23 and the coupler 14 is deemed feasible by the controller 26 at a given vehicle 12 position may be based on whether alignment would result between the hitch assembly 23 and the coupler 14 if the vehicle 12 executed a reverse maneuver at the maximum steering angle $\delta_{max}$ from the given vehicle 12 position. In operation according to the illustrated example, the hitch assembly 23 is initially misaligned with the coupler 14 when the vehicle 12 is at the endpoint 35, as shown in FIG. 8A. As illustrated in FIG. 8B, the vehicle 12 maneuvers forward along line 100 from the endpoint 35 until the controller 26 determines that alignment of the hitch assembly 23 with the coupler 14 of the trailer 16 is feasible via a reverse maneuver of the vehicle 12 at the maximum steering angle $\delta_{max}$ (represented by line 102 corresponding with an alignment path generated by controller 26) from the forwardly-maneuvered position 106 of the vehicle 12. When the position 106 is reached, the controller 26 generates a command to terminate the forward maneuver and stop the vehicle 12.

In some aspects, the controller 26 may make the feasibility determination based on additional and/or alternative factors. For example, in addition to basing feasibility on expected intersection of the hitch assembly 23 and coupler 14 at a maximum steering angle $\delta_{max}$, the controller 26 may base the feasibility of alignment on whether the vehicle 12 travels a distance beyond the vehicle position where expected intersection is first determined (e.g., endpoint 35). In other words, the controller 26 may be configured to not determine that alignment is feasible until the vehicle 12 travels a distance beyond the point where the hitch assist system 10 initially determines that intersection between the hitch assembly 23 and the coupler 14 may occur via a rearward maneuver of the vehicle 12 at the maximum steering angle $\delta_{max}$. In various embodiments, this additional factor in determining the feasibility of alignment may aid in minimizing error and/or uncertainty that may arise in determining a planned path of the vehicle 12. It is contemplated that, in some implementations, having the vehicle 12 travel the additional distance may increase the likelihood of successfully aligning the hitch assembly 23 with the coupler 14 via the rearward maneuver of the vehicle 12.

The controller 26 may make the feasibility determination based on whether the controller 26 determines that alignment may be achieved by executing a rearward maneuver of the vehicle 12 using the path derivation routine 66. In other words, the controller 26 may determine feasibility based on the outputs of the path derivation routine 66 that is also utilized in deriving the positioning path 32 of the vehicle 12. It is contemplated that an additional distance may be factored into the determination.

An example of the above-described embodiments, where it may be required that a minimum forward travel distance threshold $T_{min}$ be exceeded by the vehicle 12 during the forward maneuver before the forward maneuver of the vehicle 12 is stopped based on the determination that alignment is feasible is shown in FIGS. 9A and 9B. As discussed above, the controller 26 may be configured to not prompt termination of the forward maneuver of the vehicle 12, when the vehicle 12 has not exceeded a minimum forward travel distance threshold $T_{min}$, despite the controller 26 determining that alignment between the hitch assembly 23 and the coupler 14 may occur via a rearward maneuver of the vehicle 12 at the maximum steering angle $\delta_{max}$ (or at a steering angle $\delta$ less than the maximum steering angle $\delta_{max}$ used in path derivation routine 66). Further, in some embodiments, termination of the forward maneuver may not be prompted by the controller 26, despite the vehicle 12 traveling the additional distance beyond the point where the hitch assist system 10 initially determines that intersection between the hitch assembly 23 and the coupler 14 may occur, based on the vehicle 12 not having exceeded the minimum forward travel distance threshold $T_{min}$.

Figure 9D:
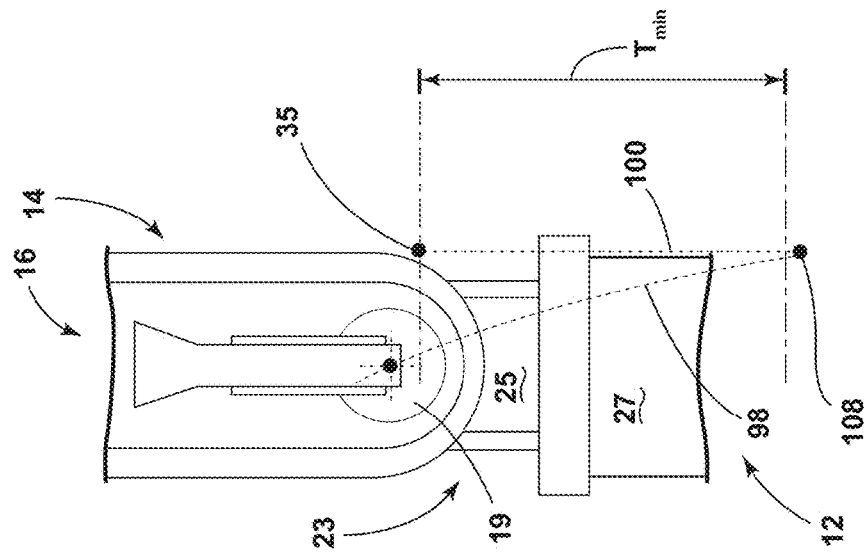
FIG. 9D is an overhead schematic view of the hitch assembly of the vehicle and the coupler of the trailer showing the hitch assembly in the aligned position relative to the coupler.
Figure 9C:
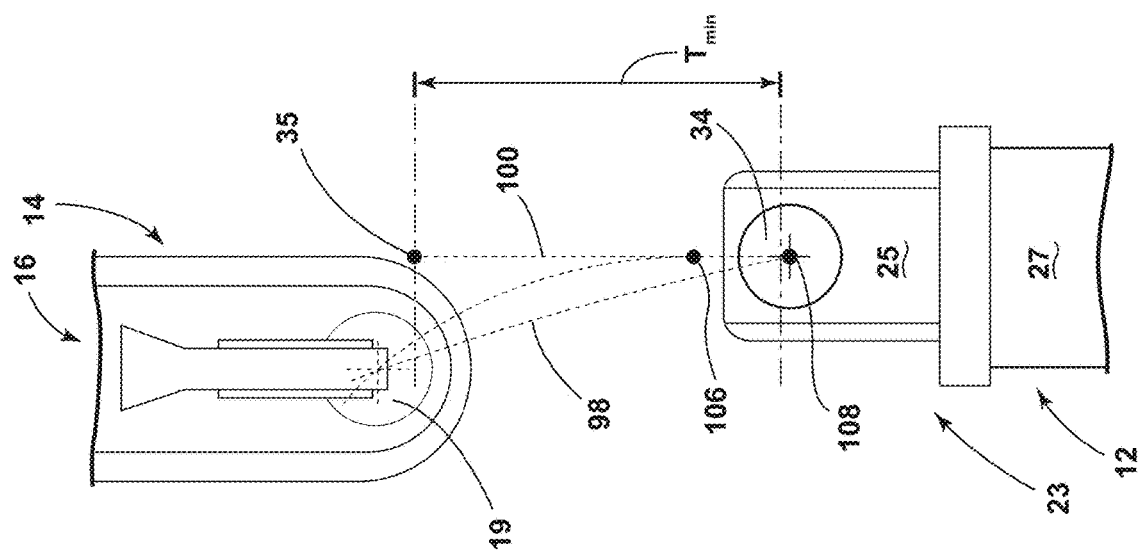
FIG. 9C is an overhead schematic view of the hitch assembly of the vehicle and the coupler of the trailer showing the hitch assembly maneuvered forward from the misaligned position a distance that exceeds a minimum forward travel distance threshold.

In operation of system 10 according to the present example of FIGS. 9A-9C, the hitch assembly 23 is initially misaligned with the coupler 14 when the vehicle 12 is at the endpoint 35, as shown in FIG. 9A. As illustrated in FIG. 9B, the vehicle 12 maneuvers forward along line 100 from the endpoint 35 to the position 106 where the controller 26 determines that intersection of the hitch assembly 23 with the coupler 14 is expected via a reverse maneuver of the vehicle 12 at the maximum steering angle $\delta_{max}$ (represented by line 102). However, as depicted, the distance traveled along line 100 to the position 106 does not exceed the minimum forward travel distance threshold $T_{min}$, despite expected intersection of the hitch assembly 23 and the coupler 14 via a rearward maneuver from the position 106. Accordingly, as shown in FIG. 9C, the forward maneuver of the vehicle 12 continues along line 100 until the minimum forward travel distance threshold $T_{min}$ has been exceeded at the forwardly-maneuvered position 108 of the vehicle 12. When the position 108 is reached, the controller 26 generates a command to terminate the forward maneuver and stop the vehicle 12.

The minimum forward travel distance threshold $T_{min}$ may be factored into determining when the forward maneuver of the vehicle 12 is terminated to aid in minimizing error that may result in misalignment after a subsequent rearward maneuver of the vehicle 12. In particular, a routine that utilizes the minimum forward travel distance threshold $T_{min}$ may allow for more precise subsequent rearward vehicle maneuvers than a routine that terminates forward movement of the vehicle 12 upon determining expected intersection, regardless of how close the vehicle 12 is to the trailer 16. In some instances, utilizing the minimum forward travel distance threshold $T_{min}$ may aid the system in avoiding any imprecision that may result from attempting to precisely position the vehicle 12 via one or more short movements or "nudges" of the vehicle 12 in the rearward direction. "Nudging" the vehicle 12 in this way may cause error that results in misalignment of the hitch assembly 23 and the coupler 14. For example, in some embodiments, if the vehicle 12 is stopped before the vehicle 12 exceeds the minimum forward travel distance threshold $T_{min}$, the vehicle 12 may rock backward upon releasing the brakes, which may negatively impact the accuracy of the subsequent rearward maneuver. It is contemplated that, in various embodiments, the minimum forward travel distance threshold $T_{min}$ may be set to one or more of a variety of distances based on one or more of a variety of factors and/or parameters. For example, in some implementations, the minimum forward travel threshold may be set such that a full rotation of a wheel of the vehicle 12 must occur before the threshold is exceeded.

Figure 10B:
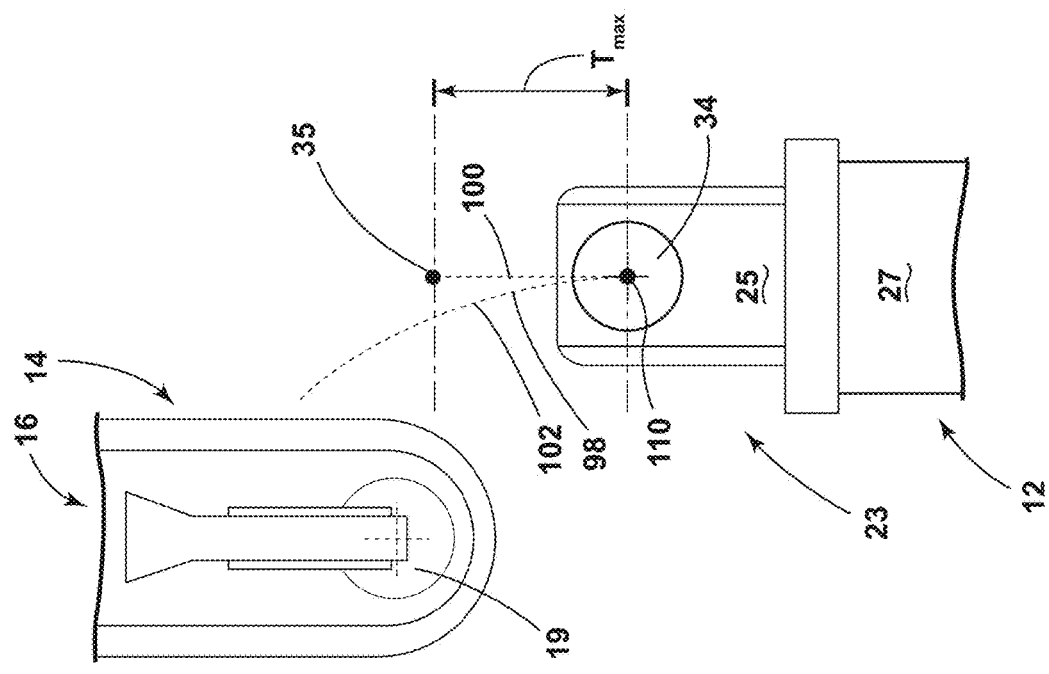
FIG. 10B is an overhead schematic view of the hitch assembly of the vehicle and the coupler of the trailer showing the hitch assembly forwardly maneuvered from the misaligned position a distance that meets a maximum forward travel distance threshold.
Figure 10A:
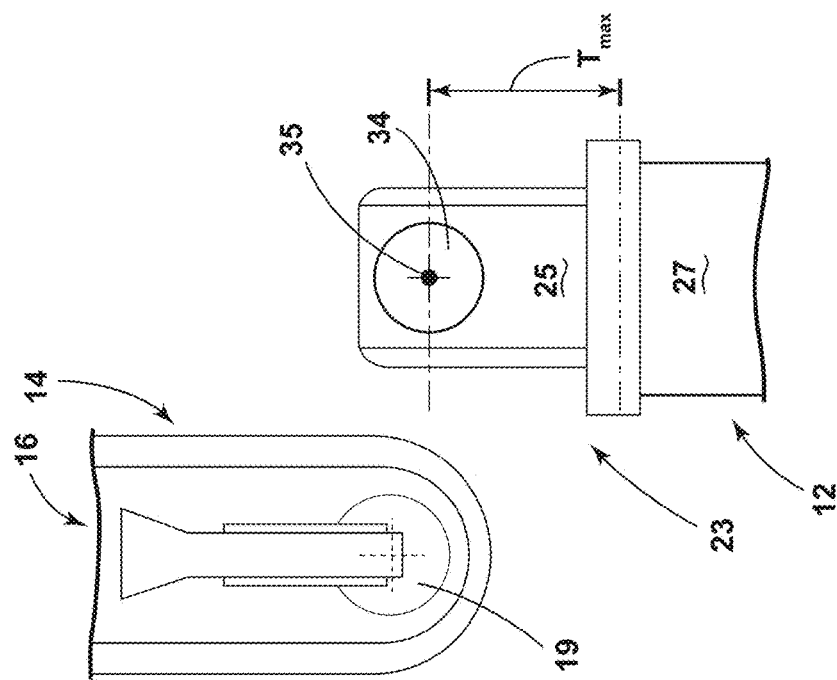
FIG. 10A is an overhead schematic view of the hitch assembly of the vehicle and the coupler of the trailer showing the hitch assembly in the misaligned position relative to the coupler

Referring now to FIGS. 10A and 10B, in another example, the distance of the forward maneuver may be partially based on whether a maximum forward travel distance threshold $T_{max}$ is met by the forward maneuver of the vehicle 12. In some embodiments, the controller 26 may be configured to generate a command to stop the forward maneuver of the vehicle 12 when the maximum forward travel distance threshold $T_{max}$ is met by the forward maneuver of the vehicle 12. Further, the controller 26 may be configured to generate the command to stop the forward maneuver despite the vehicle 12 being in a position where alignment of the hitch assembly 23 and the coupler 14 is not determined to be feasible via execution of a subsequent rearward maneuver of the vehicle 12.

In operation of system 10 in the present example, the hitch assembly 23 is initially misaligned with the coupler 14 when the vehicle 12 is at the endpoint 35, as shown in FIG. 10A. As illustrated in FIG. 10B, the vehicle 12 maneuvers forward along line 100 from the endpoint 35. Meanwhile the controller 26 evaluates whether alignment of the hitch assembly 23 and coupler 14 would be feasible at the changing positions of the vehicle 12 along line 100. As shown in FIG. 10B, the maximum forward travel distance threshold $T_{max}$ of the vehicle 12 is met at the vehicle 12 position 110, and the controller 26 terminates the forward maneuver to stop the vehicle 12, despite alignment of the hitch assembly 23 and the coupler 14 being infeasible via a rearward maneuver of the vehicle 12 at the maximum steering angle $\delta_{max}$ (represented by line 102) from the position 110 of the vehicle 12.

It is contemplated that, in various embodiments, the maximum forward travel distance threshold $T_{max}$ may be set to one of a range of values based on one or more of a variety of factors and/or parameters. In some embodiments, the maximum forward travel distance may be set to a predetermined value (e.g., 2 feet, etc.). In some embodiments, the maximum forward travel distance threshold $T_{max}$ may vary based on certain conditions. For example, the maximum forward travel distance threshold $T_{max}$ may be based on the surroundings of the vehicle 12 as sensed by the sensing system 15. By way of illustration, in a non-limiting example, the maximum forward travel distance threshold $T_{max}$ may be set to two feet in a first instance based on the fact that an obstacle is detected, by the sensing system 15, slightly more than two feet from the front bumper of the vehicle 12, such that unintended contact due to the forward maneuver of the vehicle 12 would be avoided. In a second instance, the maximum forward travel distance threshold $T_{max}$ may be set to three feet based on an obstacle being detected, by the sensing system 15, slightly more than three feet from the front bumper of the vehicle 12. It is contemplated that the maximum forward travel distance threshold $T_{max}$ may be adjusted mid-maneuver based on changing surrounding conditions and/or other factors, in some embodiments. Further, it should be appreciated that, the maximum forward travel distance threshold $T_{max}$ may refer to distance traveled by the vehicle 12 and/or position of the vehicle 12, in some embodiments (e.g., position of the vehicle 12 generally, relative to the endpoint 35, relative to the trailer 16, etc.).

In various embodiments, the steering angle $\delta$ of the vehicle 12 may be generally, substantially, majorly, and/or entirely constant during the forward maneuver of the vehicle 12. In some embodiments, the steering angle $\delta$ may be fixed during the forward maneuver of the vehicle 12. In some examples, movement of the vehicle 12 while maneuvering forward may be generally, substantially, majorly, and/or entirely straight. In other words, the steering angle $\delta$ may be initially adjusted such that fixing the steering angle $\delta$ prior to the forward maneuver results in the vehicle 12 traveling straight in the vehicle-forward direction during the forward maneuver. It is contemplated that in other aspects, the vehicle 12 may turn during the forward maneuver. Further, it is contemplated that, in still further aspects, the steering angle $\delta$ of the vehicle 12 may vary throughout the course of the forward maneuver.

The forward maneuver of the vehicle 12 ends when the controller 26 generates a command prompting one or more systems (e.g., brake control system, powertrain control system, etc.) of the vehicle 12 to terminate movement of the vehicle 12. The one or more systems may then execute the command to stop the vehicle 12.

Referring back to FIGS. 8A-10B, the alignment reattempt routine 84 may also include the rearward maneuver of the vehicle 12 after the forward maneuver of the vehicle 12 has concluded. In various embodiments, the vehicle 12 may be maneuvered rearward along the alignment path 98. The alignment path 98 may be the path of the vehicle 12 that, if traveled, is predicted to result in the vehicle 12 being positioned such that the hitch assembly 23 and coupler 14 are in alignment or generally as close to alignment as possible given the starting position of the vehicle 12 and/or other factors. In some embodiments, the hitch assist system 10 may determine the alignment path 98 of the vehicle 12 by executing the path derivation routine 66. As such, in some embodiments, the same routine may be executed to determine the positioning path 32 and the alignment path 98 of the vehicle 12 (the path derivation routine 66). It is contemplated that, in some embodiments, different methods, approaches, and/or routines may be utilized to determine the alignment path 98 and/or the positioning path 32.

With further reference to FIGS. 8A-10B, as described briefly above, movement along the alignment path 98 via the rearward maneuver of the vehicle 12 may be expected to result in either (1) alignment of the hitch assembly 23 with the coupler 14, or (2) positioning of the vehicle 12 relative to the trailer 16 resulting in the hitch assembly 23 and coupler 14 being positioned as close to alignment as possible given the position of the vehicle 12 relative to the trailer 16 at the start of the rearward maneuver of the vehicle 12. In various examples, execution of the rearward maneuver along the alignment path 98 may be expected (but not guaranteed due to potential error in operating functions and/or other factors) to result in alignment of the hitch assembly 23 with the coupler 14 when the controller 26 has determined that the alignment of the hitch assembly 23 and the coupler 14 is feasible at the position of vehicle 12 from which the rearward maneuver is initiated. For example, alignment would be the expected result of maneuvering the vehicle 12 along the alignment paths 98 projected in FIGS. 8B and 9C and executed in FIGS. 8C and 9D, as in those examples, the controller 26 had determined that alignment was feasible. However, execution of the rearward maneuver along the alignment path 98 may be expected to not result in alignment when the controller 26 determines that alignment is not feasible (or has yet to determine alignment is feasible) at the position of the vehicle 12 that the rearward maneuver is initiated. This may occur when the forward maneuver of the vehicle 12 is stopped prior to the alignment becoming feasible due to the maximum forward travel distance threshold $T_{max}$ of the vehicle 12 being met before reaching a position where reversing along the alignment path actually results in alignment of hitch assembly 23 with coupler 14, as shown in FIG. 10B. In such an instance, a subsequent maneuver may position the vehicle 12 such that the hitch assembly 23 and the coupler 14 are positioned as close to alignment as possible based on the vehicle starting position 110. In various embodiments, the rearward movement of vehicle 12 along the alignment path 98 in such a situation may result in the maximum steering angle $\delta_{max}$ being commanded by controller 26 throughout the rearward maneuver along the alignment path 98. It is contemplated that, in some embodiments, other, lesser, steering angles may be used in addition or in the alternative to the maximum steering angle $\delta_{max}$.

In various embodiments, the rearward maneuver of the vehicle 12 along the alignment path 98 may be generally continuous rearward movement of the vehicle 12. In some embodiments, the rearward maneuver may be uninterrupted by intervening forward movements of the vehicle 12. In some examples, the rearward maneuver may be uninterrupted by intervening stoppages of the vehicle 12 prior to the conclusion of the rearward maneuver, wherein the vehicle 12 is stopped. In various embodiments, the alignment path 98 may be updated as the rearward maneuver of the vehicle 12 is executed. This may improve the chances of successful alignment of the hitch assembly 23 and the coupler 14, as the position of the trailer 16 and the coupler 14 of the trailer 16 may become more clearly detectable by the sensing system 15 as the distance between the vehicle 12 and the trailer 16 decreases.

When the rearward maneuver of the vehicle 12 along the alignment path 98 is completed, the controller 26 may generate a command prompting one or more systems (e.g., brake control system, powertrain control system, etc.) of the vehicle 12 to terminate movement of the vehicle 12. The one or more systems then execute the command to stop the vehicle 12. In various embodiments, the brake control system of the vehicle 12 may be prompted to hold the vehicle 12 in a generally fixed position (i.e., brake pressure will remain applied) upon termination of the rearward maneuver of the vehicle 12 until one or more other steps of the alignment reattempt routine 84 are executed, as further discussed below herein.

In various embodiments, when the rearward maneuver of the vehicle 12 is terminated, the alignment of the hitch assembly 23 relative to the coupler 14 may be recalculated by the hitch assist system 10 to determine whether the vehicle 12 is in the aligned position. In some embodiments, upon completion of the rearward maneuver, the hitch assist system 10 may recalculate the offset Δc between the hitch assembly 23 and the coupler 14. Having recalculated the offset Δc, the controller 26 may compare the offset Δc with the offset threshold $\Delta c_{max}$ to determine whether the hitch assembly 23 is aligned with the coupler 14 (i.e., determine whether the offset Δc is within or exceeds the offset threshold $\Delta c_{max}$). In various embodiments, if the hitch assembly 23 is not aligned with coupler 14, the alignment reattempt routine 84 may repeat the steps of maneuvering the vehicle 12 forward and subsequently maneuvering the vehicle 12 rearward along the alignment path 98 one or more times until the hitch assembly 23 is ultimately aligned with the coupler 14. Alternatively, the alignment reattempt routine 84 may end after one or more unsuccessful attempts to realign the hitch assembly 23 with the coupler 14 via the forward and rearward maneuvers. As discussed further herein, the alignment reattempt routine 84 may include steps in addition to maneuvering the vehicle 12 in the forward and rearward directions. For example, in some embodiments, the initial calculation and the subsequent recalculation of the offset Δc and/or the initial or subsequent comparisons of the calculated offsets Δc and the offset thresholds $\Delta c_{max}$ may be steps included in the alignment reattempt routine 84. Further, it is contemplated that the alignment reattempt routine 84 may include other steps discussed in more detail below, as well as various other steps not discussed herein, in some embodiments.

Figure 11:
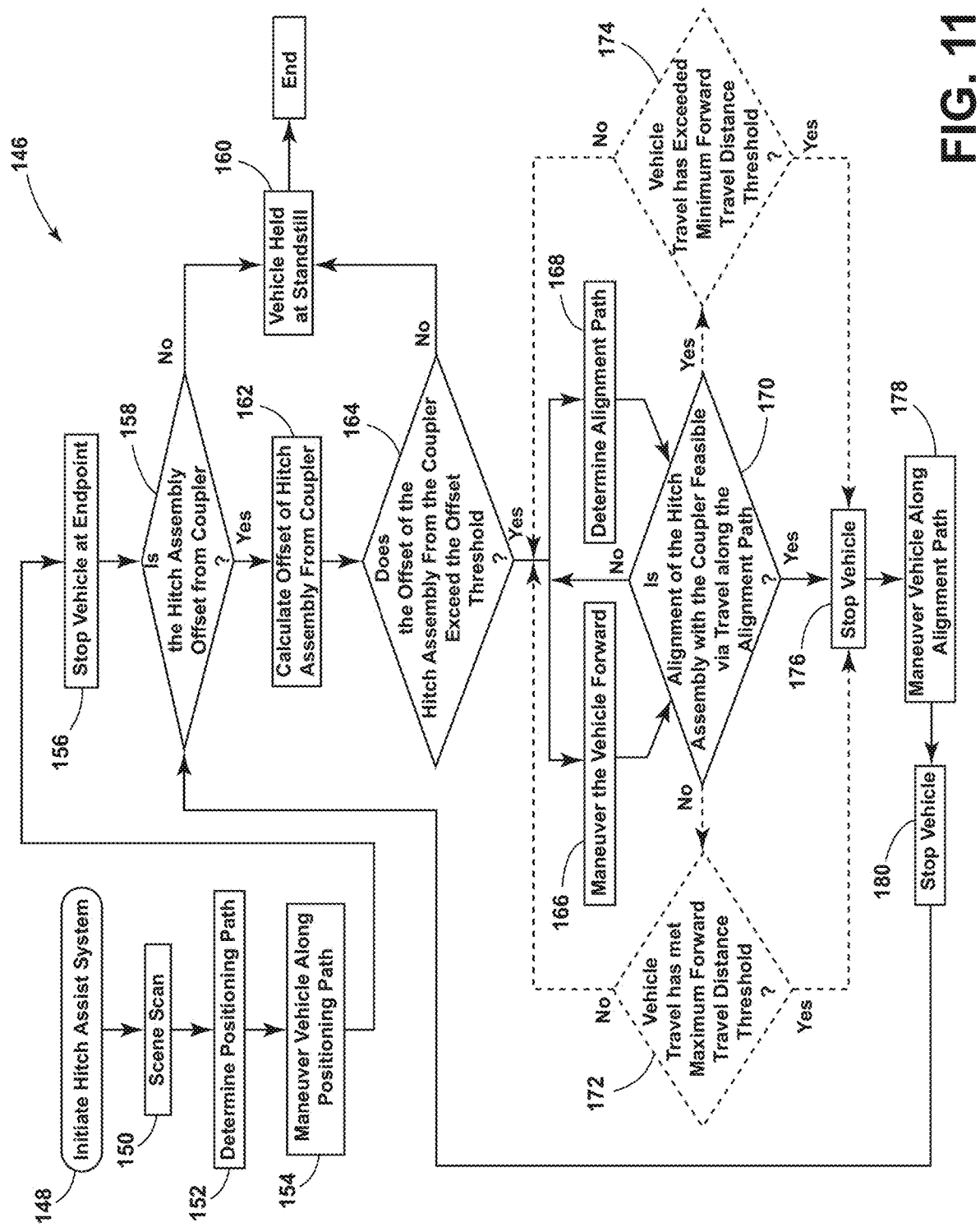
FIG. 11 is a flowchart depicting logic implemented by a system according to a method for aligning the hitch assembly with the coupler.

Referring now to FIG. 11, a method 146 for operation of the hitch assist system 10 is exemplarily illustrated in a flow chart. Embodied within the broader method implemented by system 10, is a method as described with reference to FIGS. 3-7 for correcting misalignment between a hitch assembly 23 and a coupler 14 (steps 158-180). In the step 148, the hitch assist system 10 is initiated. In some examples, the hitch assist system 10 may be initiated at any point when the coupler 14 is in the field of view 49, 51, 53a, 53b of at least one camera 48, 50, 52a, 52b within imaging system 18. Accordingly, once the hitch assist system 10 is initiated, the controller 26 can use imaging system 18 to scan the viewable scene using any or all available cameras 48, 50, 52a, 52b at step 150. The scene scan, at step 150, can create the image patch that may be used to then identify the coupler 14 and, optionally, the associated trailer 16.

At step 152, the hitch assist system 10 may determine the positioning path 32 of the vehicle 12 that will place the hitch assembly 23 proximate to the coupler 14 (i.e., in alignment with the coupler 14 or as close to alignment with coupler 14 as feasible). In various embodiments, step 152 of determining the positioning path 32 may include the sub-step of determining the endpoint 35 of the positioning path 32 that places the hitch ball 34 and the coupler 14 proximate to one another. The controller 26 uses the path derivation routine 66 to determine the positioning path 32 to align the vehicle 12 with the endpoint 35. Once the positioning path 32 has been derived, the hitch assist system 10 can ask the user U to relinquish control of at least the steering wheel of vehicle 12 (and, optionally, the throttle 73 and brake control system 70, in various implementations of the hitch assist system 10, wherein the controller 26 assumes control of the powertrain control system 72 and the brake control system 70 during execution of the operating routine 68) while the vehicle 12 is maneuvered along the positioning path 32 (FIG. 3).

When it has been confirmed that user U is not attempting to control steering system 20 (for example, by using the torque sensor 80), the controller 26 begins to move vehicle 12 along the determined positioning path 32, at step 154. Furthermore, the hitch assist system 10 may determine if a transmission system 92 is in the correct gear and may shift to the desired gear or prompt the user U to shift to the desired gear. The hitch assist system 10 may then control the steering system 20 to maintain the vehicle 12 along the positioning path 32 as either the user U or the controller 26 controls the speed of vehicle 12 using the powertrain control system 72 and the braking control system 70. As discussed herein, the controller 26 or the user U can control at least the steering system 20, while tracking the position 28 of the coupler 14 until the vehicle 12 reaches the endpoint 35. It is contemplated that the maneuvering of the vehicle 12 may occur manually, semi-autonomously, or autonomously. In semi-autonomous or autonomous examples of the hitch assist system 10, the controller 26 generates commands provided to the vehicle brake control system 70, the powertrain control system 72, and/or the power assist steering system 20 to maneuver the vehicle 12 toward the trailer 16 so that the hitch assembly 23 arrives at the endpoint 35. In semi-autonomous examples, the driver of the vehicle 12 may be required to apply gas and/or apply the brakes while the controller 26 steers the vehicle 12. In yet other examples, the user U may move the vehicle 12 to the desired endpoint 35. As such, in some embodiments, steps 148-154 may be eliminated in favor of manual alignment of the hitch assembly 23 with the coupler 14. In such embodiments, the alignment reattempt method 146 described below may still be executed.

At step 156, the hitch assist system 10 brings the vehicle 12 to a stop at the endpoint 35. Once the vehicle 12 comes to a stop, at step 156, the hitch assist system 10 determines whether the hitch assembly 23 is offset from the coupler 14 at step 158. Whether the offset Δc exists and the extent thereof, may be determined by utilizing various sensors and devices of the sensing system 15 in conjunction with controller logic. If the hitch assist system 10 determines that the hitch assembly 23 is not offset from the coupler 14, then the method proceeds to the step 160 of holding the vehicle 12 at a standstill. This may be accomplished via a command from the controller 26 to the vehicle brake control system 70 to engage the brakes. The method would then conclude after step 160.

If, however, at step 158, the hitch assist system 10 determines that the hitch assembly 23 is offset from the coupler 14, then the method 146 proceeds to the step 162 of calculating the offset Δc of the hitch assembly 23 from the coupler 14. This may be accomplished by the hitch assist system 10 through analysis of position data of the hitch assembly 23 and the coupler 14, which may be perceived via inputs from the vehicle sensing system 15 (e.g., the rear camera 48 in conjunction with image processing algorithms, which determine the position of each item, proximity sensors, etc.). The difference in position may be defined as the alignment error. The alignment error may be utilized in conjunction with the position data to determine an amount and direction of offset Δc between the hitch assembly 23 and the coupler 14.

Having calculated the offset Δc of the hitch assembly 23 from the coupler 14, it is next determined whether the offset Δc of the hitch assembly 23 from the coupler 14 exceeds the offset threshold $\Delta c_{max}$, at step 164. If the hitch assist system 10 determines that the offset Δc does not exceed the offset threshold $\Delta c_{max}$, the method proceeds to the step 160 of holding the vehicle 12 at a standstill. If, however, the hitch assist system 10 determines that the calculated offset Δc does exceed the offset threshold $\Delta c_{max}$, the method proceeds to steps 166 and/or 168, as described below. It is contemplated that the step 158 of determining whether the hitch assembly 23 is offset from the coupler 14, the step 162 of calculating the offset Δc of the hitch assembly 23 from the coupler 14, and/or the step 164 of determining whether the offset Δc of the hitch assembly 23 from the coupler 14 exceeds the offset threshold $\Delta c_{max}$, may be combined and/or executed generally simultaneously with one another, in some embodiments.

Upon determination at step 164 that the offset Δc of the hitch assembly 23 from the coupler 14 exceeds the offset threshold $\Delta c_{max}$, the method 146 progresses to the step 166 of maneuvering the vehicle 12 forward and/or the step 168 of determining the alignment path 98 of the vehicle 12. In various embodiments, step 168 and step 166 may be performed simultaneously. In other words, the hitch assist system 10 may determine the alignment path 98 of the vehicle 12 in step 168 while the vehicle 12 is maneuvering forward in step 166. Variations in sequence are contemplated. For example, in some embodiments, an alignment path 98 may be determined before the vehicle 12 is maneuvered forward or may be determined after the vehicle 12 has maneuvered forward a predetermined distance. As discussed above, determination of the alignment path 98 may carried out by the controller 26 executing the path derivation routine 66, in some embodiments.

During the execution of steps 166 and/or 168, the hitch assist system 10 determines whether alignment of the hitch assembly 23 with the coupler 14 is feasible via travel of the vehicle 12 along the determined alignment path 98 from the position of the vehicle 12, at step 170. If the hitch assist system 10 determines that alignment of the hitch assembly 23 with coupler 14 is not feasible via travel along the alignment path 98 at the vehicle's 12 current position, the hitch assist system 10 may continue to execute steps 166 and/or 168 as discussed above. In some embodiments, during the execution of steps 166 and/or 168 the hitch assist system 10 may additionally determine whether the vehicle 12 has met the maximum forward travel distance threshold $T_{max}$ in its forward maneuver (step 172, shown in phantom), while the hitch assist system 10 also evaluates whether alignment is feasible at step 170. Accordingly, if it is determined at step 170 that alignment of the hitch assembly 23 and the coupler 14 is not feasible at the position of the vehicle 12, continued forward maneuvering of the vehicle 12 via execution of step 166 may be dependent upon whether the maximum forward travel distance threshold $T_{max}$ has been met. If it is determined at step 172 that the maximum forward travel distance threshold $T_{max}$ of the vehicle 12 has not been met, then the step 166 of maneuvering the vehicle 12 forward will continue. If, however, it is determined that the maximum forward travel distance threshold $T_{max}$ has been met, execution of step 166 is terminated and the vehicle 12 is stopped at step 176.

If, during the execution of steps 166 and/or 168, the hitch assist system 10 determines, at step 170, that alignment of the hitch assembly 23 with the coupler 14 is feasible via travel of the vehicle 12 along the determined alignment path 98 at the current position of the vehicle 12, the hitch assist system 10 may stop the vehicle 12 (step 176). The hitch assist system 10 may additionally determine whether the vehicle 12 has exceeded the minimum forward travel distance threshold $T_{min}$ (step 174, shown in phantom) before stopping the vehicle 12 (step 176) based on a determination that alignment is feasible at the position of the vehicle 12 (step 170). If, at step 174, it is determined that the vehicle 12 travel has exceeded the minimum forward travel distance threshold $T_{min}$ (and alignment is deemed feasible at step 170), then the method 146 will proceed to step 176, wherein the hitch assist system 10 stops the vehicle 12. If, at step 174, it is determined that the vehicle 12 travel has not exceeded the minimum forward travel distance threshold Tin, then step 166 and/or 168 will continue and the vehicle 12 will maneuver further forward. It is contemplated that various combinations of steps 166-174 may be carried out in the method 146 simultaneously. For example, in some embodiments, the hitch assist system 10 may execute each of steps 166-174 simultaneously during certain portions of the alignment reattempt routine 84.

After the vehicle 12 has been stopped at step 176, the vehicle 12 is maneuvered along the alignment path 98 at step 178. In various embodiments, maneuvering the vehicle 12 along the alignment path 98 may involve generally the same process as maneuvering the vehicle 12 along the positioning path 32 described above. Upon completion of the maneuver along the alignment path 98, the hitch assist system 10 stops the vehicle 12 at step 180. After stopping the vehicle 12, the routine continues with the hitch assist system 10 determining whether the hitch assembly 23 is offset from the coupler 14 at step 158, discussed above. The routine may then proceed from step 158 as described above. It is contemplated that, in some embodiments, the method 146 may include various other steps not specifically mentioned.

A variety of advantages may be derived from the use of the present disclosure. For example, use of the disclosed hitch assist system 10 provides a system for correcting misalignment between a hitch assembly 23 and a coupler 14 that may result from human or machine error. Further, during correction of misalignment, stopping forward maneuvers of the vehicle 12 based on a determination that alignment is feasible at a maximum steering angle $\delta_{max}$ of the vehicle 12 may result in more efficient use of time and space during misalignment correction. Additionally, constraining forward maneuvers of the vehicle 12 during misalignment correction to distances between the maximum and minimum forward travel distance thresholds $T_{max}$, $T_{min}$ may improve precision of vehicle 12 movements and account for obstacles in the driving path of the vehicle 12.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting a vehicle in hitching with a trailer, comprising:
    a sensing system configured to separately detect a vehicle hitch assembly and a trailer coupler; and
    a controller configured to:
        designate an initial position of a portion of the hitch assembly relative to the coupler as an attempted alignment position;
        determine an offset between the hitch assembly and the coupler at the attempted alignment position;
        generate a command for maneuvering the vehicle forward based on the offset exceeding an offset threshold;
        generate a rearward alignment path; and
        prompt termination of the forward maneuver of the vehicle based on a determination that alignment of the hitch assembly with the coupler is feasible via execution of the alignment path.

2. The system of claim 1, wherein the offset between the hitch assembly and the coupler is determined while the vehicle is stopped.

3. The system of claim 1, wherein the sensing system includes one or more cameras.

4. The system of claim 3, wherein at least one of the one or more cameras is located on a rear of the vehicle and is disposed to capture one or more images of a rear-vehicle scene.

5. The system of claim 1, wherein the controller is further configured to maintain a steering angle of a pair of steered wheels of the vehicle at a fixed angle during the forward maneuver of the vehicle.

6. The system of claim 1, wherein:
    the hitch assembly comprises a hitch ball and the coupler comprises a coupler ball socket; and
    the offset is determined between the hitch ball and the coupler ball socket.

7. The system of claim 6, wherein the offset threshold is about one half of a diameter of the hitch ball.

8. The system of claim 1, wherein the controller only terminates the forward maneuver of the vehicle based on the determination that alignment of the hitch assembly with the coupler is feasible via execution of the alignment path after a minimum forward travel distance threshold has been exceeded by the vehicle.

9. A method of correcting misalignment between a vehicle hitch assembly and a trailer coupler, comprising the steps of:
    determining an offset of a hitch ball of the hitch assembly relative to the coupler;
    maneuvering the vehicle forward based on the offset exceeding an offset threshold;
    calculating an alignment path to align the hitch ball with the coupler;
    stopping the forward maneuver of the vehicle based on at least one of a determination that alignment of the hitch ball with the coupler is feasible via execution of the alignment path and a maximum forward travel distance threshold being met by the forward maneuver of the vehicle;

maneuvering the vehicle rearward along the alignment path;

stopping the rearward maneuver of the vehicle at an end of the alignment path; and recalculating the offset of the hitch ball relative to the coupler.

10. The method of claim 9, wherein, when in the step of stopping the forward maneuver of the vehicle, the forward maneuver of the vehicle is stopped based on the determination that alignment of the hitch ball with the coupler is feasible via execution of the alignment path, the forward maneuver of the vehicle is stopped only after a minimum forward travel distance threshold has been exceeded by the vehicle during the forward maneuver.

11. The method of claim 9, wherein, when in the step of stopping the forward maneuver of the vehicle, the forward maneuver of the vehicle is stopped based on the maximum forward travel distance threshold being met, the recalculated offset exceeds the offset threshold and the method further includes a subsequent step of maneuvering the vehicle forward based on the recalculated offset exceeding the offset threshold.

12. The method of claim 9, wherein when the forward maneuver of the vehicle is stopped based on the determination that alignment of the hitch ball with the coupler is feasible via execution of the alignment path, the distance traveled in the forward maneuver of the vehicle is less than the maximum forward travel distance threshold.

13. The method of claim 9, further comprising the step of:
maintaining a substantially constant steering angle of the steered wheels of the vehicle while maneuvering the vehicle forward.

14. The method of claim 13, wherein the substantially constant steering angle is about 0°.

15. The method of claim 9, wherein a maximum steering angle of the vehicle is maintained while maneuvering the vehicle rearward along the alignment path when the forward maneuver of the vehicle is stopped based on the maximum forward travel distance threshold being met by the forward maneuver of the vehicle.

16. A system for assisting in aligning a vehicle with a trailer, comprising:

a sensing system configured to separately detect a hitch assembly of the vehicle and a coupler of the trailer; and a controller configured to generate commands for:
maneuvering the vehicle along a positioning path to an endpoint to position the hitch assembly in an initial position adjacent to the coupler;
maneuvering the vehicle forward from the endpoint;
terminating the forward maneuver of the vehicle based on a determination that alignment of the hitch assembly with the coupler is feasible via a rearward movement of the vehicle at a designated maximum steering angle; and
subsequently maneuvering the vehicle rearward along an alignment path such that the hitch assembly is aligned with the coupler upon completion of the alignment path.

17. The hitch assist system of claim 16, wherein an offset between the hitch assembly and the coupler is determined while the vehicle is stopped at the endpoint.

18. The hitch assist system of claim 17, wherein the controller is configured to generate the command for maneuvering the vehicle forward from the endpoint based on a determination that the offset between the hitch assembly and the coupler exceeds an offset threshold.

19. The hitch assist system of claim 16, wherein the controller determines the positioning path of the vehicle via execution of a path derivation routine and determines the alignment path of the vehicle via a subsequent execution of the path derivation routine.

20. The hitch assist system of claim 16, wherein the controller is further configured to generate a command to maintain a pair of steered wheels of the vehicle at a fixed angle during the forward maneuver of the vehicle.

* * * * *